United States Patent [19]
Paquette

[11] 3,807,620
[45] Apr. 30, 1974

[54] APPARATUS FOR FORMING A CONSTRUCTION OF WIRES

[76] Inventor: Marcel Paquette, 393 Crestwood, Cheshire, Conn. 06410

[22] Filed: July 28, 1972

[21] Appl. No.: 276,244

[52] U.S. Cl............... 228/47, 140/92.2, 228/57
[51] Int. Cl............................................. B23k 37/04
[58] Field of Search.................. 228/4, 5, 6, 47, 57; 140/92.1, 92.2; 29/602, 605

[56] References Cited
UNITED STATES PATENTS

| 804,250 | 11/1905 | Miller | 140/92.2 |
|---|---|---|---|
| 2,368,389 | 1/1945 | Von Knauf | 29/605 |
| 3,550,645 | 12/1970 | Keogh | 140/92.2 |

Primary Examiner—J. Spencer Overholser
Assistant Examiner—Robert J. Craig
Attorney, Agent, or Firm—Anthony P. Delio

[57] ABSTRACT

Wires are brazed together to form patterned constructions in apparatus which includes a die assembly and a support for the die assembly above a surface. The die assembly includes an apertured plate having a plurality of surface grooves for holding a plurality of wires in a predetermined pattern on the plate with a portion of each of the wires extending over the edge of the aperture. A separate second member of the die assembly is positioned in the aperture for vertical movement therethrough, the member having a guide for initially positioning the extended portions of the wires. The second member of the die assembly, after the wires are brazed together, engages the extended wire portions so as to dislodge the wire construction as a whole from the grooves. A channel in the plate adjacent the periphery of the aperture prevents contact of brazing material with the plate during the brazing.

13 Claims, 9 Drawing Figures

PATENTED APR 30 1974 3,807,620
SHEET 1 OF 2

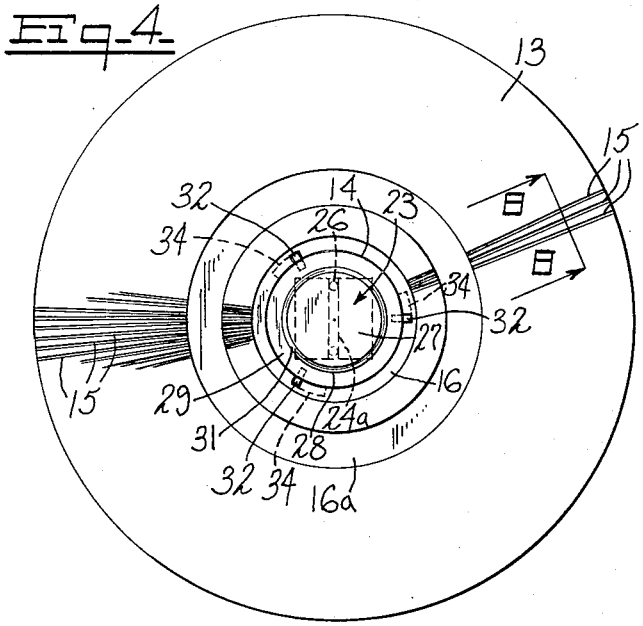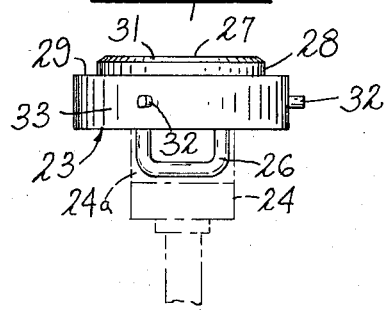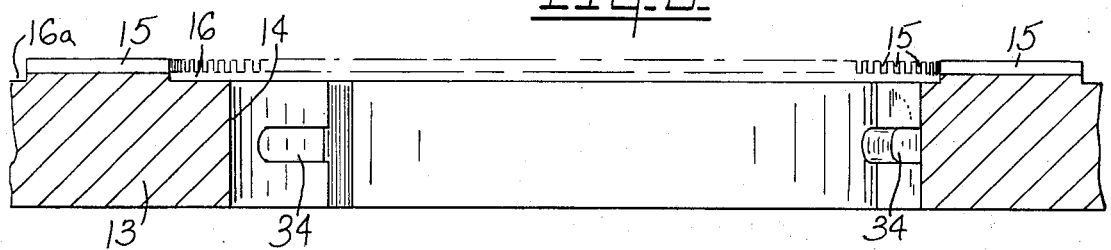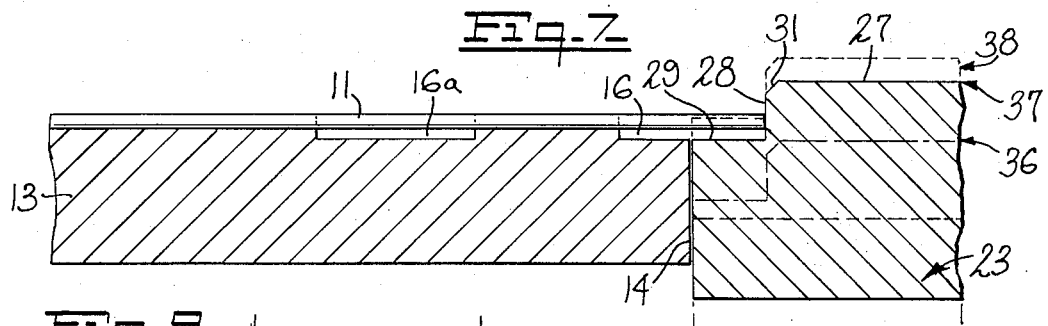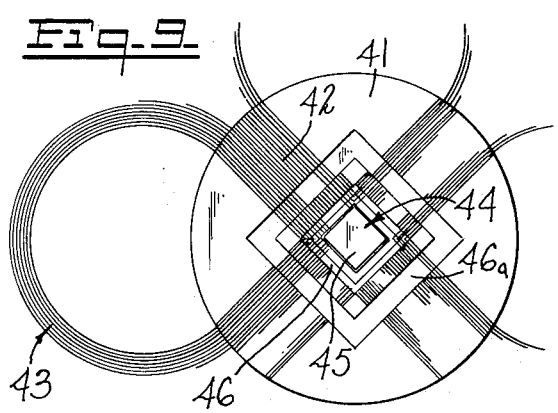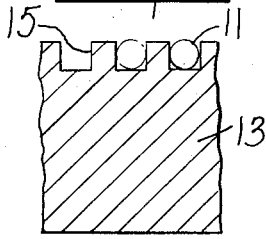

APPARATUS FOR FORMING A CONSTRUCTION OF WIRES

BACKGROUND OF THE INVENTION

This invention relates to the formation of a construction of wires in predetermined patterns, and more particularly to apparatus for efficiently achieving this result.

Wire constructions are formed for many uses, including decorations, either alone or in combination with other items such as wall clocks and the like. Some uses are based on the reinforcing properties of the wire construction as well as decorative features, as in chairs and other pieces of furniture. The constructions usually involve brazing together a plurality of wires while the wires are held in a predetermined pattern. Since it is difficult to initially position and to maintain a plurality of wires in a predetermined pattern, especially when the wires are curved or bent back upon themselves, some means must be provided for supporting and holding the wires in the predetermined pattern during the brazing operation. Moreover, it is desirable that the wires be brazed at points which will not be conspicuous in the intended use of the wire construction. In addition, difficulties are often encountered in preventing contact of the brazing or other fixative material with a jig or fixture used to position and hold the wire construction, with resultant inconvenience and expense in removing the material from the fixture or jig. Still further, although there are many ways to position and hold a patterned wire construction on a jig or fixture, problems are encountered in removing the patterned wire construction after brazing, without damage to the construction.

OBJECTS AND SUMMARY

Accordingly, an object of the invention is to provide a new and improved way of initially positioning and then holding a plurality of wires in a predetermined pattern so that the wires can be efficiently connected as by brazing or other fastening techniques.

Another object is to provide new and improved apparatus which, while holding a wire construction in a predetermined pattern during a brazing step, will also avoid the contact of the brazing or other connective material with the apparatus.

Still another object of the invention is to provide new and improved apparatus from which a pattern wire construction may be quickly removed after the wires have been brazed or otherwise affixed together, so that the wire construction may be removed from the apparatus in a single piece and without injury to the construction.

These and other objects, features and advantages of the invention will become apparent from the specification which follows.

In summary, the foregoing objects are achieved by apparatus which includes a die assembly and means for supporting the die assembly above a surface. The die assembly includes an apertured plate having a plurality of surface grooves for holding a plurality of wires in a predetermined pattern on the plate such that a portion of each of the wires extends over the edge of the aperture. A second member of the die assembly is movably positioned in the aperture of the plate. The movable member has a guide for initially positioning the extended portions of the wires. The movable member, when moved upwardly after brazing together of the wires, engages the extended wire portions so as to dislodge the wire construction as a whole from the grooves.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the nature and objects of the invention, reference is had to the following description taken in conjunction with the accompanying drawings in which:

FIG. 4 is a partially diagrammatic top plan view of apparatus of the invention;

FIG. 5 is an enlargement of a portion of the apparatus shown in FIG. 4 with other portions of apparatus shown diagrammatically;

FIG. 6 is an enlarged sectional view of a portion of another part of apparatus of the invention;

FIG. 7 is a sectional view of a portion of apparatus of the invention, similar to the view of FIG. 3 but somewhat enlarged to illustrate alternate positions of a portion of the structure;

FIG. 8 is a vertical section along the line 8—8 of FIG. 4 showing details of structure; and FIG. 9 is a partially schematic top plan view similar to the views of FIGS. 2 and 4, showing another embodiment of apparatus of the invention.

Figure 1:
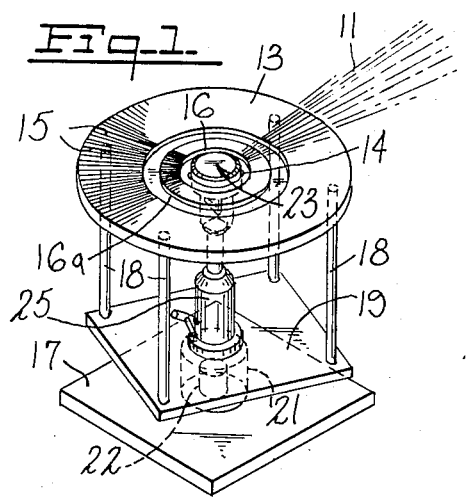
FIG. 1 is a perspective view on reduced scale of apparatus of the invention.
Figure 2:
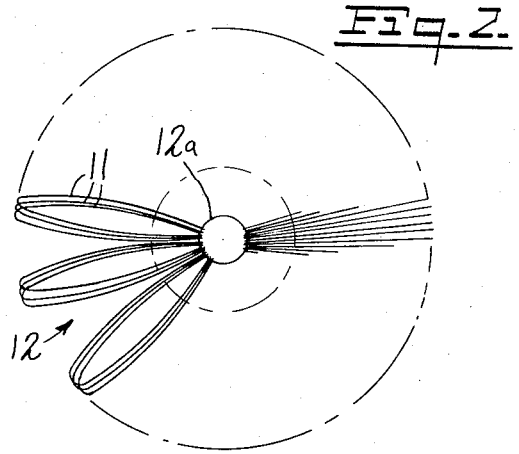
FIG. 2 is a partially diagrammatic top plan view of a portion of a patterned wire construction which may be formed using the apparatus.

With respect to the drawings, FIGS. 1–8 illustrate one embodiment of apparatus of the invention. In this embodiment a plurality of wires 11 are positioned and held in a pattern 12 so that the wires may be connected together as by brazing, welding, soldering or other means, often to a reinforcing member such as a ring 12a. This is accomplished by a plate 13 having a generally centered aperture 14 and a plurality of grooves 15 set in the plate around the aperture so as to provide a selection of grooves to form and hold the wires in the desired pattern. A channel 16 adjacent the aperture 14, preferably on the periphery of the aperture, provides a well or similar space below the region where it is intended to fasten the wires together as by brazing. The channel 16 thus prevents contact of brazing material with the plate 13. Similar channels such as channel 16a may be set in the plate 13 at distances further removed from the aperture 14, if it is desired to braze or otherwise fasten the wires together at positions outwardly of the aperture. While the drawings show radial placement of the grooves 15 on the plate 13, it will be evident that the grooves may be set in any direction or at any depth, even so as to cross one over the other, in accordance with the wire construction patterns desired.

Figure 3:
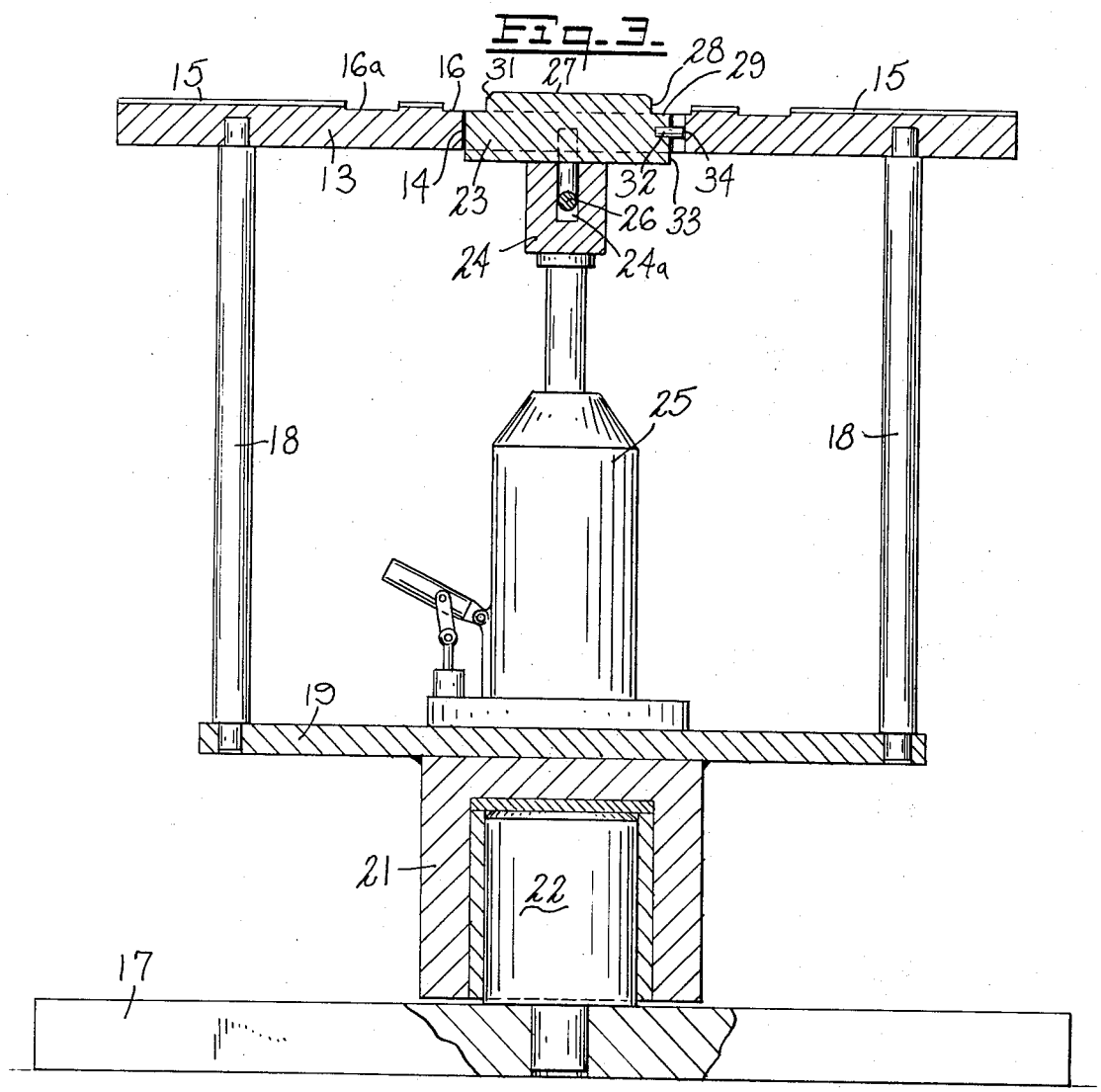
FIG. 3 is a partially sectioned enlarged side view of apparatus shown in FIG. 1.

As shown in FIG. 3, the plate 13 is supported above a surface such as a work table 17 by legs or rods 18 which are themselves supported on a lower plate 19. Desirably, the plate 19 is a portion of a turntable having a tubular support 21 rotatably mounted on a bearing member 22 which is connected to the table 17. The plate 13 and associated structure is supported above the surface 17 for reasons which will become apparent in the ensuing discussion with reference to the movable member 23.

The plate 13 forms a die assembly with a member 23 which is positioned in the aperture 14 for vertical movement therethrough. The member 23, which may take various forms such as a plate, disk or plug, may be supported on a column 24 which in turn is supported on the piston of a jack 25. The jack 25 is mounted on the lower plate 19. If desired, the column 24 may be provided with a slot 24a to receive another means for positioning the member 23, such as a knob or handle 26, as more clearly appears in FIG. 5.

The member 23 has a raised central guide portion 27 which serves to guide and position the portions of the wires which extend over the edge of the aperture 14, by uniform abutment against the wall 28 of the raised portion. The remaining horizontal portion or surface 29 of the member 23 will therefore contact the undersides of the extended wire portions when the surface 29 is at the same elevation as channel 16 of plate 13, as shown in FIG. 3. The wall 28 therefore serves as a guiding abutment for initial positioning of the wires on the plate 13. It will be evident that by movement upwardly of the member 23 from the position of equal elevation of channel 16 and surface 29, the surface 29 will contact the extended wire portions and urge such portions upwardly, with the result that the patterned wire construction as a whole may be conveniently lifted from the grooves 15. This dislodgment of the wires from the grooves is facilitated further by the inwardly inclined edges 31 of the raised portion 27, which inclined edges thereby provide leverage for dislodging the wires from the grooves. This feature is especially useful when, despite precautions, some brazing material might contact the plate 13 causing the wires to stick to the plate, although in the usual case the channel 16 and other channels such as channel 16a, would prevent this result.

While the member 23 is depicted with discrete surfaces 28, 29 and 31, it will be apparent that the cooperative effects of such surfaces are achievable by other designs of the surfaces which combine into a single surface the geometries of the three surfaces. For example, such designs may be either a continuous concavity forming the upper periphery of the member 23, or an upper edge of the member 23 which is inclined inwardly around the periphery of the member 23. The important consideration is that the design will not only serve to initially position and maintain the position of the wire ends or portions of the wires extending over the aperture 14, but also will provide for efficient dislodging of the wires in the finished wire construction from the grooves 15 upon elevation of the member 23 in the aperture 14.

The position of the member 23 in aperture 14 relative to plate 13 may be controlled by a lever as by the piston of a jack 25 against supporting column 24, or by an appendage such as the handle 26. Positioning may also be achieved, or may be further controlled, by means for locking the member 23 in position in the aperture 14. Such means may comprise a plurality of pins 32 affixed to or formed on the wall 33 of member 23, which pins are engageable in horizontal slots 34 of plate 13, as illustrated in FIGS. 3-6. Each of the slots 34 is open at a discrete point along their lengths of the surface of the plate 13 such that the pins 33 may enter therethrough into the slots 34. Upon rotation of the member 23 (counterclockwise according to the design of FIG. 4) the member 23 is locked in position with respect to plate 15. The locked position normally will correspond to the desired relative positions of the plate 13 and member 23 during a brazing operation so as to avoid accidental displacement of the member 23. Such accidental displacement could cause displacement of the wires in the grooves, particularly in the case where the wires may be resiliently biased against the raised portion 27 of the member 23, for example, when each of the wires 15 is formed in a circle with one portion extending over the aperture 14 against the wall 28 of raised portion 27.

In operation, with reference particularly to FIG. 7, the member 23 is first lowered so that the surface of its raised portion 27 is at the position generally indicated at 36. The wires 11 are then inserted in the grooves 15 of the plate 13 with portions, such as the inner ends of the wires, extending over the aperture 14 of the plate. The member 23 is then raised to the position indicated at 37 so as to uniformly position the inner ends of the wires. It will be noted that in this position the lower surface 29 of member 23 is at the same elevation as channel 16 of the plate 13, thereby forming a well under wire 11 at the point where it is desired to braze the wires together. This space, which overlaps the adjacent edges of plate 13 and member 23, thus prevents substantial contact between the brazing material and either of plate 13 or member 23. Channel 16a similarly provides a brazing point without contact of brazing material with member 23.

After the brazing operation is completed, the member 23 is elevated to the position generally indicated at 38 in FIG. 7, during which elevation the inclined edge 31 contacts the extended portions or ends of wires 11 while simultaneously the lower surface 29 of member 23 contacts the undersides of the wires 11. As a result, the wire construction is raised out of the grooves 15 as a unit and without the danger of undue stress upon any discrete points of connection between the wires. The entire wire construction therefore may be lifted cleanly from the apparatus and removed to a further step in a manufacturing operation as desired.

While the invention has been described above (FIGS. 1-8) with reference to an embodiment wherein the plate 13 and member 23 are circular, and wherein the grooves 15 generally radiate from the aperture 14, it will be evident that the invention is not limited to such geometry but may be practiced with any useful arrangement of grooves, wire sizes, wire dimensions and lengths, geometries of plates 13 and member 23, means for locking a plate 13 and member 23 together at the desired relative elevations, means for retractably moving a member 23 through the aperture 14, and other structure.

One such alternate design is illustrated in FIG. 9. Here a circular plate 41 corresponding to plate 13 of FIGS. 1-8 has four sets of surface grooves 42 such that each set of grooves is at a right angle to the next adjacent set, the wires as a whole radiating from the aperture of the plate to form a clover-leaf pattern 43. This pattern is facilitated by the rectangular form of the central movable member 44 (corresponding to member 23 of FIGS. 1-8) as well as of other equivalent structure, such as the raised upper portion 45 of the movable member 45, and the channels 46 and 46a, corresponding to channels 16 and 16a of FIGS. 1–8. In all other respects, the operation of the apparatus is essentially the same as with the embodiment of FIGS. 1–8.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Apparatus for forming a construction of wires, comprising, in combination:
   a die assembly comprising:
      a plate having an aperture and a plurality of surface grooves for holding a plurality of wires in a predetermined pattern on said plate such that a portion of each of said wires is extendable over the edge of the aperture, and further including a member movably positioned in said aperture, said member having a guide for initially positioning the said extended portions of said wires, and said member when moved upwardly being engageable with said extended wire portions so as to dislodge said wires from said grooves; and
   means for supporting said die assembly above a working surface.

2. Apparatus as in claim 1 also including means for retractably urging said movable member vertically through said aperture.

3. Apparatus as in claim 1 wherein said plate has a channel adjacent the periphery of said aperture, whereby said wires may be brazed without brazing material contacting said plate.

4. Apparatus as in claim 1 wherein said die assembly is adapted to rotate above said working surface.

5. Apparatus as in claim 1 wherein said support means includes a turntable upon which is mounted said plate, whereby said die assembly is rotatable above said working surface.

6. Apparatus as in claim 2 wherein said urging means comprises a jack.

7. Apparatus as in claim 2 wherein said urging means comprises a handle connected to said movable member.

8. Apparatus as in claim 1 wherein said guide is an abutment defined by the outer wall of a raised central portion on said movable member.

9. Apparatus as in claim 8 wherein at least a portion of said outer wall is inclined inwardly towards the center of said movable member, whereby leverage is provided for dislodging said wires from said grooves.

10. Apparatus as in claim 1 wherein said aperture and said movable member are circular and said grooves radiate from said aperture.

11. Apparatus as in claim 1 wherein said aperture and said movable member are rectangular and said grooves comprise four sets, each set radiating from said aperture at a right angle to the next adjacent set of grooves.

12. Apparatus as in claim 1 wherein said die assembly includes means for locking said plate and said movable member together at predetermined relative vertical positions.

13. Apparatus as in claim 12 wherein said locking means is defined by a plurality of pins on the periphery of said movable member and horizontal slots in said aperture, each of said slots being open at a discrete point along their lengths to the upper surface of said plate, whereby said pins and said slots are simultaneously engageable.

* * * * *